(12) United States Patent
Chiaves et al.

(10) Patent No.: US 12,110,947 B2
(45) Date of Patent: Oct. 8, 2024

(54) CONTINUOUSLY VARIABLE TRANSMISSION

(71) Applicant: ELTAT S.R.L., Turin (IT)

(72) Inventors: Carlo Chiaves, Turin (IT); Paolo Chiaves, Turin (IT)

(73) Assignee: ELTAT S.R.L., Turin (IT)

( * ) Notice: Subject to any disclaimer, the term of this patent is extended or adjusted under 35 U.S.C. 154(b) by 0 days.

(21) Appl. No.: 17/283,923

(22) PCT Filed: Oct. 9, 2019

(86) PCT No.: PCT/IB2019/058584
§ 371 (c)(1),
(2) Date: Apr. 8, 2021

(87) PCT Pub. No.: WO2020/075078
PCT Pub. Date: Apr. 16, 2020

(65) Prior Publication Data
US 2021/0388886 A1    Dec. 16, 2021

(30) Foreign Application Priority Data
Oct. 9, 2018   (IT) .................... 102018000009270

(51) Int. Cl.
*F16H 15/30*   (2006.01)
(52) U.S. Cl.
CPC .................... *F16H 15/30* (2013.01)
(58) Field of Classification Search
CPC .......... F16H 15/16; F16H 15/18; F16H 15/22; F16H 15/30
See application file for complete search history.

(56) References Cited

U.S. PATENT DOCUMENTS

| | | | |
|---|---|---|---|
| 2,734,389 A * | 2/1956 | Strecker ................. | F16H 15/44 476/39 |
| 2,786,363 A * | 3/1957 | Davies .................... | F16H 15/38 476/72 |

(Continued)

FOREIGN PATENT DOCUMENTS

| | | | |
|---|---|---|---|
| CN | 107339384 | * | 11/2017 |
| DE | 2457060 A | | 7/1976 |
| DE | 102006039319 A1 | | 2/2008 |

OTHER PUBLICATIONS

English translation of CN 107339384 to Li, published Nov. 2017.*

(Continued)

*Primary Examiner* — William C Joyce
(74) *Attorney, Agent, or Firm* — Ferguson Case Orr Paterson

(57) ABSTRACT

A continuously variable transmission includes a first main shaft and a second main shaft and at least one auxiliary shaft, rotatable around a rotation axis and interposed between the first and second main shafts. The auxiliary shaft has two secondary roll surfaces. Each secondary roll surface is shaped as a solid of revolution and is placed in contact with a respective primary roll surface of the first and second main shafts. The primary and secondary roll surfaces are shaped so that straight lines tangential thereto in contact points between the auxiliary shaft and the first and second main shafts pass through two distinct intersection points between the axes of the first and second main shafts.

13 Claims, 6 Drawing Sheets

(56) References Cited

U.S. PATENT DOCUMENTS 3,242,748 A * 3/1966 Prager ................... F16H 15/40
        476/51
3,261,220 A   7/1966 Kraus

OTHER PUBLICATIONS

International Search Report, issued in PCT/IB2019/058584, mailed Dec. 4, 2019, Rijswijk, Netherlands.
Written Opinion, issued in PCT/IB2019/058584, mailed Dec. 4, 2019, Rijswijk, Netherlands.

* cited by examiner

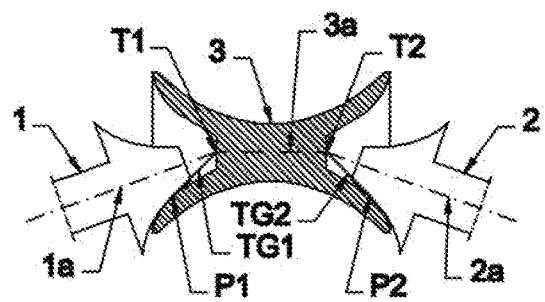
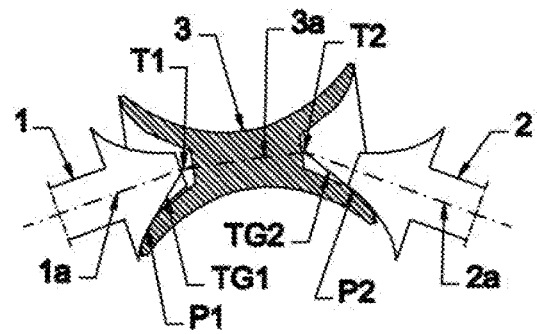
FIG.3A FIG.3B
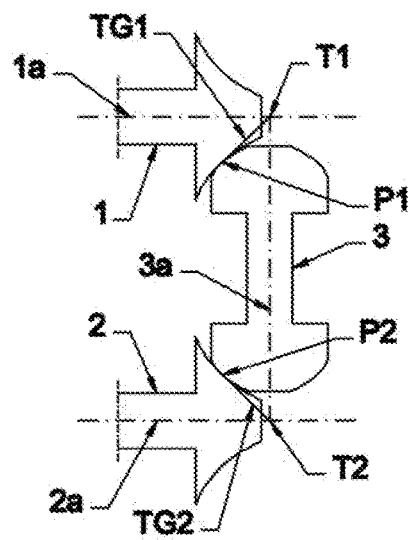
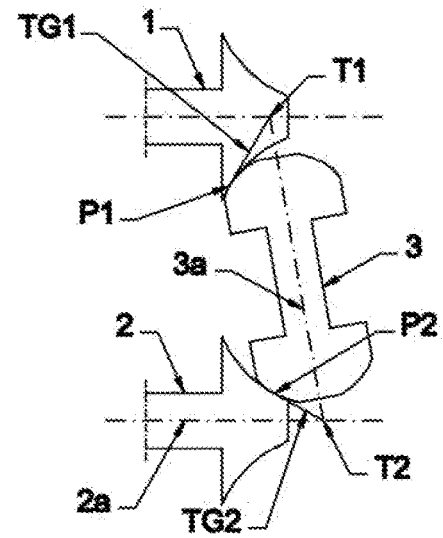
FIG.4A FIG.4B
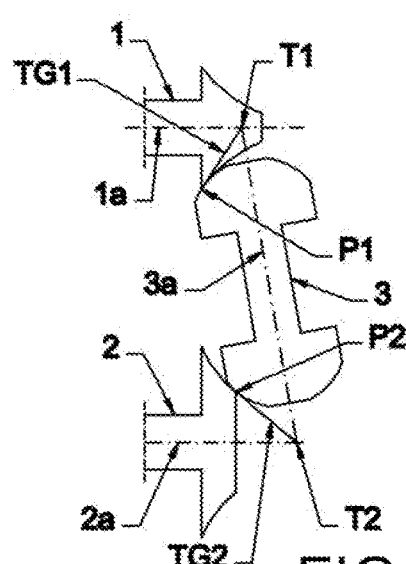
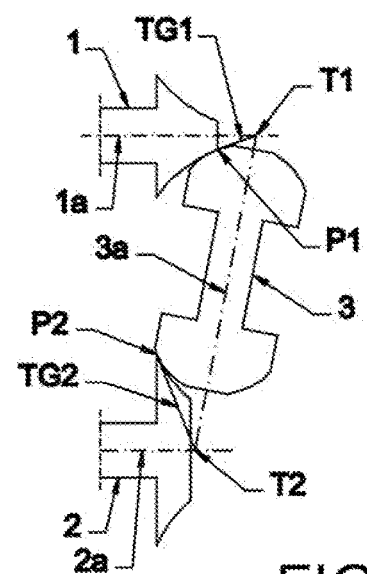
FIG.5A FIG.5B

CONTINUOUSLY VARIABLE TRANSMISSION

CROSS-REFERENCE TO RELATED APPLICATIONS

This application is a National Phase Application of PCT International Application No. PCT/IB2019/058584, having an International Filing Date of Oct. 9, 2019 which claims the benefit of priority to Italian Patent Application No. 102018000009270, filed Oct. 9, 2018, each of which is hereby incorporated by reference in its entirety.

FIELD OF THE INVENTION

The present invention is generally located in the field of motion transmission systems; in particular, the invention relates to a continuous gearbox, for the transmission of motion between two shafts.

BACKGROUND OF THE INVENTION

In mechanical applications, there is a widespread need to build a transmission, i.e. a device that allows to connect two rotary shafts so as to have available a variable transmission ratio.

Such device is usually arranged between a motor and a user and it is employed in many fields, from the road haulage sector to every type of industry.

In many applications, it is preferable to be able to vary the transmission ratio continuously, in the sense of having available all intermediate transmission ratios between a maximum and a minimum value. Hereafter, a device providing this feature shall be defined "continuously variable transmission".

Currently, different types of continuously variable transmission exist.

A very widely used type is the one with pulleys with variable diameter, in which the transmission is provided by a belt that transmits motion between two pulleys. Each pulley is formed by two discs with conical surfaces. As the disks of each pulleys are moved closer or farther away, the winding radius of the belt on each pulley is changed and consequently the transmission ratio is changed as well.

There are also numerous types of continuously variable transmission that use the rolling of two or more rigid surfaces, integral with the axes of the shafts and so arranged that, by actuating appropriate mechanisms, the contact point between the two surfaces moves so as to progressively modify the radii of the theoretical roll circles and, consequently, to change the transmission ratio.

In continuously variable transmissions based on this principle, it is important for the surfaces that transmit motion to have "pure" rolling between them. The expression "pure rolling" means rolling without "prying motion". With reference to the relative motion between the two bodies in contact, "prying motion" (also called "perforation motion" or "spin motion") is the relative rotation around the axis perpendicular to the two surfaces in the contact point.

Prying motion is harmful and unwanted for two reasons: mainly because it promotes wear of the parts, severely limiting the torque that can be transmitted or the useful life of the piece, and also because it causes dissipative losses due to rubbing. To transmit motion in real applications, the contact between the two surfaces cannot be a single point, as it is in theoretical kinematic motion, but it necessarily has a footprint with non-zero extension. Therefore, moving away from the center of the contact area, the prying motion causes rubbing between the parts.

This defect, understandably, compromises the efficiency and limits the usable range of the continuously variable transmission.

SUMMARY OF THE INVENTION

A purpose of the present invention is to obtain a transmission with continuously variable transmission ratio, in which motion is transmitted by pure rolling, i.e. without prying motion in the contact points.

To obtain this result, a continuously variable transmission according to the present invention comprises two main shafts, between which motion is to be transmitted with variable transmission ratio. For example, a first (driving) shaft can be connected to a motor, and the second (driven) shaft can be connected to a user.

The two main shafts lie on a same plane, which hereafter will be indicated as "reference plane", and their rotation axes may be mutually inclined, or parallel, or coaxial.

The rotation axes of the main shafts are fixed on the reference plane, i.e. they cannot move with respect to an outer box or frame of the transmission. The two main shafts are also bound so as not to move in the direction parallel to its own rotation axis and, therefore, they can only rotate around said rotation axis.

Each of the main shafts is provided with a rolling surface profiled in ways that will be better described further on in the present description.

There is also an auxiliary shaft, rotatable around an axis of rotation that lies on the reference plane identified by the rotation axes of the main shafts. The rotation axis of the auxiliary shaft is movable along said reference plane (while remaining contained on said plane).

The auxiliary shaft is shaped, at its own ends, so as to have two rolling surfaces (profiled in ways described further on) placed in contact with the respective roll surfaces of the main shafts.

During use of the transmission, the roll surfaces of the auxiliary shaft roll without rubbing on the corresponding roll surfaces of the main shafts.

For the simplicity of the description, it is assumed that one of the main shafts is connected to a motor and the other main shaft to a user: thus, the driving shaft transmits the rotation to the auxiliary shaft and the latter transmits it to the driven shaft.

Motion is transmitted thanks to the tangential force transmitted by friction in the contact points between the roll surfaces of the auxiliary shaft and the corresponding roll surfaces of the main shafts (this contact must always be maintained and subjected to an appropriate normal force).

The displacement of the auxiliary shaft along the reference plane determines the displacement of the contact points on the roll surfaces. This movement allows to vary the transmission ratio, because the ratio between the radii of the roll circles varies.

In particular, the roll surfaces are revolution surfaces obtained by rotating appropriate generatrix curves around the respective rotation axes of the shafts, and they are provided with double curvature (i.e. they can be neither "cones" nor "cylinders", which instead have a rectilinear generatrix).

The roll surfaces are mutually tangential in their contact point.

The roll surfaces are configured so that in the reference plane, for every position of the auxiliary shaft with respect to the main shafts, the straight line tangential to the generatrix curves of the roll surface of the first main shaft and of the roll surface of the auxiliary shaft in their contact point passes through the intersection point between the rotation axes of the first main shaft and of the auxiliary shaft. Concurrently, the straight line tangential to the generatrix curves of the roll surface of the second main shaft and of the roll surface of the auxiliary shaft in their contact point passes through the intersection point between the rotation axes of the second main shaft and of the auxiliary shaft.

The condition just described determines the absence of prying motion. The profile of the generatrix curves of the roll surfaces is obtainable (in ways illustrated in detail below) as the geometric locus of the points that meet the condition.

In a continuously variable transmissions according to the present invention, the intersection point between the rotation axes of the first main shaft and of the auxiliary shaft is distinct from the intersection point between the rotation axes of the second main shaft and of the auxiliary shaft. The solution indicated in the present invention allows for multiple embodiments and considerable flexibility in the design of the shapes.

BRIEF DESCRIPTION OF THE DRAWINGS

The functional and structural features of some preferred embodiments of a continuously variable transmission according to the invention will now be described. Reference is made to the accompanying drawings, wherein:

FIGS. 3A and 3B are two lateral schematic views of a system comprising two main shafts with incident axes and an auxiliary shaft in the female configuration, according to an embodiment of the present invention;

FIGS. 4A and 4B are two lateral schematic views of a system comprising two main shafts with parallel axes and an auxiliary shaft in the male configuration, according to an embodiment of the present invention;

FIGS. 5A and 5B are two lateral schematic views of a system comprising two main shafts with parallel axes and mutually different roll surfaces, according to an embodiment of the present invention;

DETAILED DESCRIPTION

Figure 1A:
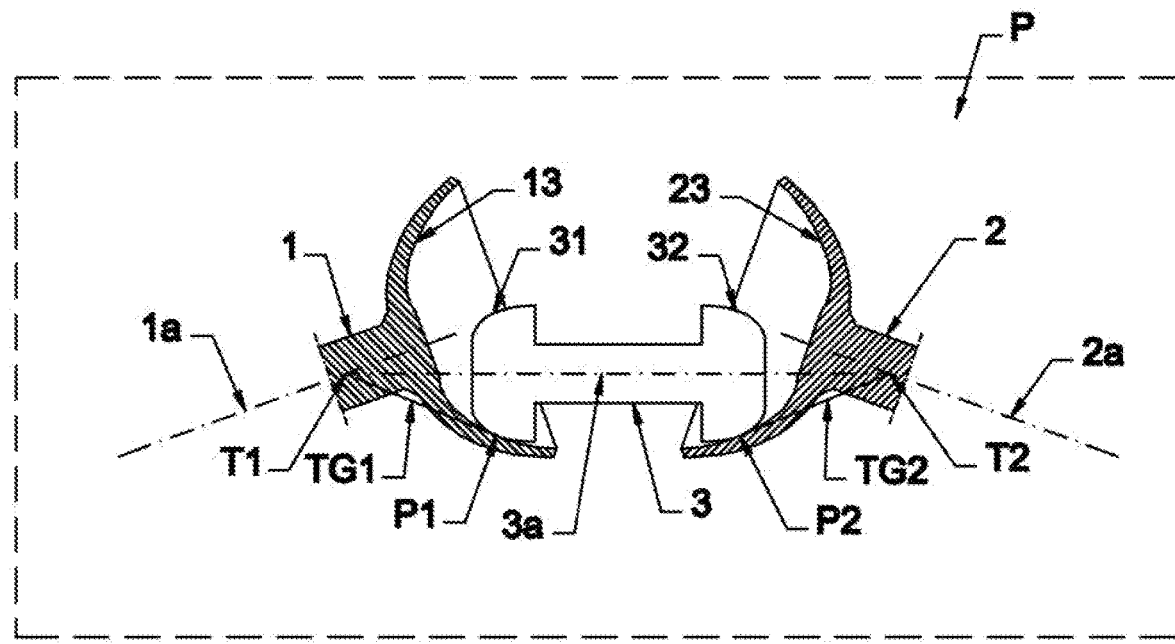
FIGS. 1A and 1B are two lateral schematic views of the terminal portions of two main shafts with incident axes, on which are present respective roll surfaces, between which is interposed an auxiliary shaft in the male configuration, according to an embodiment of the present invention (it is specified that FIGS. 1A and 1B represent two distinct operative conditions of a same embodiment of the present invention; the same holds true for the subsequent FIGS. 3A and 3B, 4a and 4B, 5A and 5B, 6A and 6B, 7A and 7B, 8A and 8B, 9A and 9B, 10A and 10B)

Before describing in detail a plurality of embodiments of the invention, it should be clarified that the present invention is not limited in its application to the construction details and to the configuration of the components presented herein or illustrated in the drawings. The present invention is able to assume other embodiments and to be implemented or realized practically in different ways. It should also be understood that the phraseology and the terminology have descriptive purpose and should not be construed to be limiting.

The present invention can be implemented according to multiple alternative construction arrangements, which appear with different geometric designs, but which realize the same type of operation.

Figure 1B:
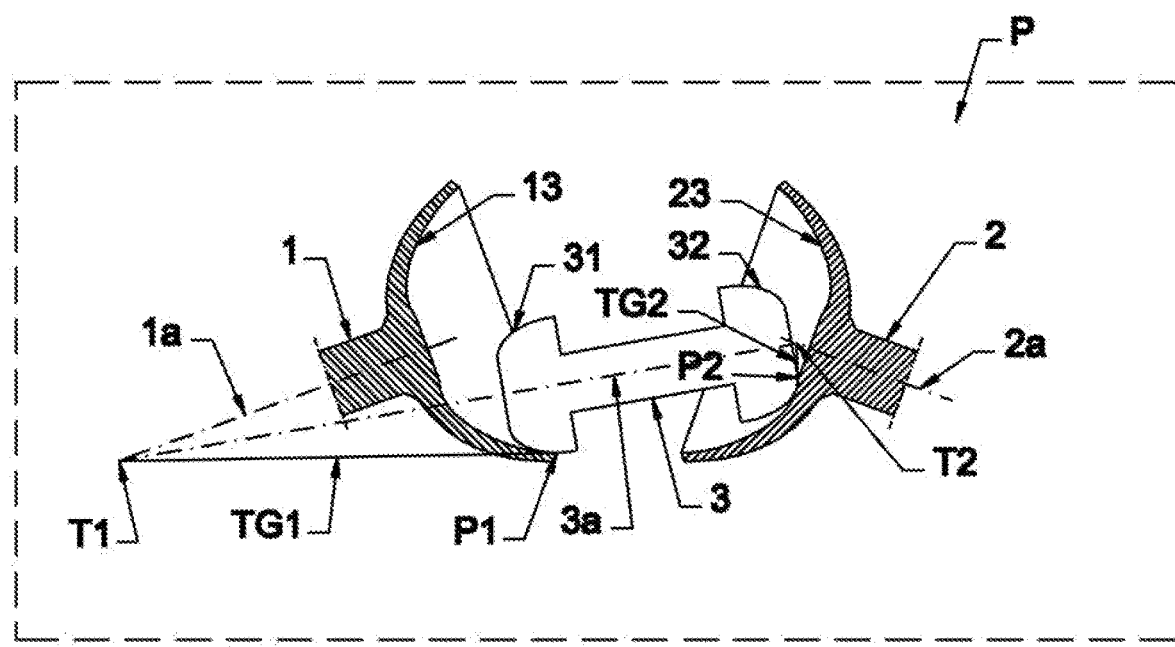

Referring, by way of example, to FIGS. 1A and 1B, a continuously variable transmission comprises a first and a second main shaft 1, 2, having respective rotation axes 1$a$, 2$a$ fixed and coplanar with respect to a reference plane P.

Said main shafts 1, 2 are each provided with a primary roll surface 13, 23 shaped as a solid of revolution.

The transmission further comprises at least one auxiliary shaft 3 (which in turn can be formed by a plurality of secondary shafts 3', 3", as shown by way of example in FIGS. 7A through 9B) rotatable around an axis of rotation 3$a$ and interposed between the main shafts 1, 2. The auxiliary shaft 3 is provided with two secondary roll surfaces 31, 32, each shaped as a solid of revolution and each placed in contact with a respective primary roll surface 13, 23 of the main shafts 1, 2, so as to transmit the motion of a main shaft to the other main shaft.

The rotation axis 3$a$ of the auxiliary shaft 3 is movable only along the reference plane P identified by the rotation axes 1$a$, 2$a$ of the two main shafts 1, 2.

Moreover, the roll surfaces 13, 23, 31, 32 are so shaped that, in the reference plane P, the line TG1 tangent to the primary roll surface 13 of the first main shaft 1 and to the corresponding secondary roll surface 31 of the auxiliary shaft 3 in the contact point P1 between said roll surfaces 13, 31 always passes through the intersection point T1 between the rotation axis 1$a$ of said first main shaft 1 and the rotation axis 3$a$ of said auxiliary shaft 3. Concurrently, in the reference plane P the line TG2 tangent to the primary roll surface 23 of the second main shaft 2 and to the corresponding secondary roll surface 32 of the auxiliary shaft 3 in the contact point P2 between said roll surfaces 23, 32 always passes through the intersection point T2 between the rotation axis 2$a$ of the second main shaft 2 and the rotation axis 3$a$ of the auxiliary shaft 3.

Moreover, the intersection point T1 between the rotation axis 1*a* of the first main shaft 1 and the rotation axis 3*a* of the auxiliary shaft 3 is distinct from the intersection point T2 between the rotation axis 2*a* of the second main shaft 2 and the rotation axis 3*a* of said auxiliary shaft 3.

All embodiments of the present invention have in common the properties illustrated above, i.e. that in the reference plane P the straight line tangent to the roll surface in the contact point always passes through the intersection point of the axes of the shafts that participate in the contact, and that the intersection between the rotation axis of the auxiliary shaft and, respectively, the rotation axes of the first and of the second main shaft takes place in two distinct points.

In this way, the secondary roll surfaces 31, 32 of the auxiliary shaft 3 roll without rubbing and without any prying motion on the respective primary roll surfaces 13, 23 of the main shafts 1, 2.

The geometric loci of the points that meet the above condition identify on the reference plane P the generatrix curves of the roll surfaces 13, 23, 31, 32.

By way of example, the profile of the generatrix curves of the roll surfaces 13, 23, 31, 32 can be drawn, with as precise an approximation as is desired, by means of the iterative process described below. The process can be carried out graphically or with an analytical numeric calculation.

In a first step, with criteria that will be specified further on, an initial profile is provided at will for the generatrix curves of the roll surfaces 31, 32 of the auxiliary shaft 3. In a second time, the generatrix curves of the roll surfaces 13, 23 of the main shafts 1, 2 are obtained by means of an iterative process, that allows to achieve the condition of absence of prying, as described above.

With reference, for exemplifying purposes, to FIGS. 2A-2D, the first step of the iterative process consists of providing an auxiliary shaft 3 provided with two secondary roll surfaces 31, 32, each shaped as a solid of revolution and provided with double curvature.

It should be noted that, to distinguish the positions of the components of the transmission in the different iterations, the reference numbers in the figures are flanked by a letter identifying the iteration (in the illustrated example, the letter "A" for the first iteration, "B" for the second, etc.). For example, the reference 3A indicates the position of the auxiliary shaft 3 in the first iteration.

Figure 2A:
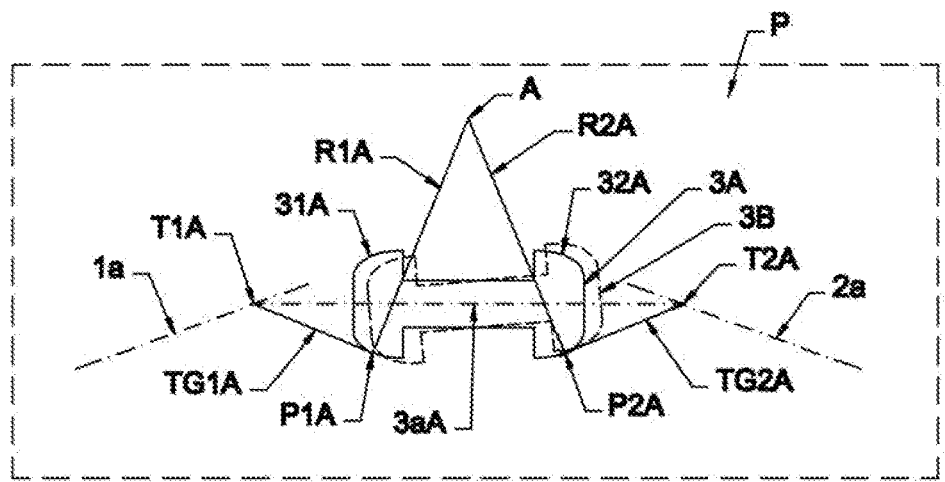
FIGS. 2A through 2D are lateral schematic views of a plurality of steps of the process to obtain the directrix curves of the roll surfaces of the main shafts, according to the embodiment illustrated in FIGS. 1A and 1B.
Figure 2B:
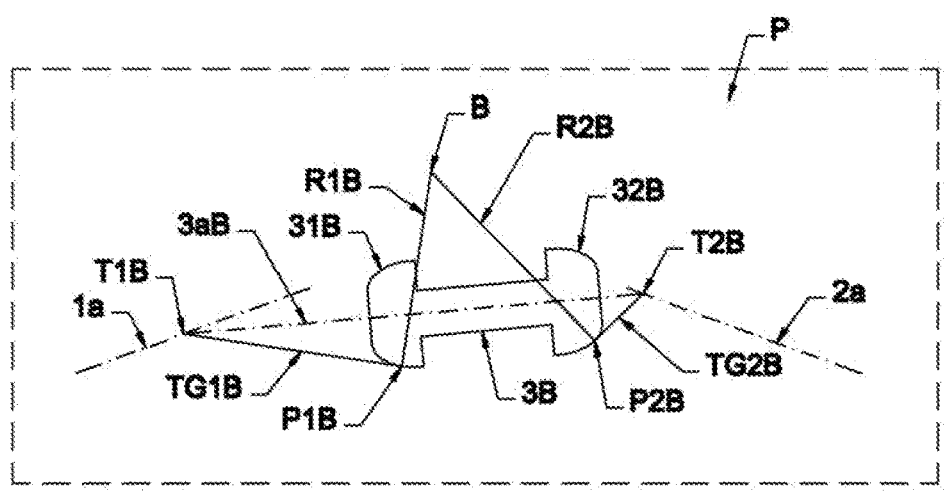

With reference to FIG. 2A, to start the iterative process the straight line TG1A is drawn, which passes through the point T1A of intersection of the rotation axes 1*a* and 3*a*A (respectively of the first main shaft 1, not shown, and of the auxiliary shaft 3A) and tangential to the profile 31A, which represents the generatrix curve of the secondary roll surface associated to the auxiliary shaft 3A. In addition, the straight line TG2A is drawn, which passes through the point T2A of intersection of the rotation axes 2*a* and 3*a*A (respectively of the second main shaft 2, not shown, and of the auxiliary shaft 3A) and tangential to the profile 32A, which represents the generatrix curve of the secondary roll surface at the opposite end of the auxiliary shaft 3A. The two initial contact points P1A and P2A are then identified, in the two points of tangency.

Two straight lines R1A, R2A are drawn perpendicular to the profiles 31A and 32A in the contact points P1A and P2A respectively.

The point A of intersection between the two straight lines R1A and R2A is the center of rotation of the first cycle of the iterative process.

A small rotation around the point A is imposed on the shaft 3A, thereby bringing it to the position 3B (second iteration). The size of the rotation to be adopted for each iteration is the smaller, the higher the desired precision of the result.

After the rotation, the point T1B of intersection is identified between the rotation axis 1*a* of the first main shaft 1 (not shown) and the rotation axis 3*a*B of the auxiliary shaft 3B (i.e. the axis of the auxiliary shaft 3 in the second iteration). In addition, the point T2B of intersection is identified between the rotation axis 2*a* of the second main shaft 2 (not shown) and the rotation axis 3*a*B of the auxiliary shaft 3B.

At this point, the two new straight lines TG1B and TG2B are drawn passing through the aforesaid intersection points T1B and T2B and tangential respectively to the secondary roll curves 31B and 32B of the auxiliary shaft 3 (in the new position 3B).

A new iteration is then carried out.

At the end of the iterations, the generatrix curves of the primary roll surfaces 13, 23 of the main shafts 1, 2 are drawn with the following method:

the curves must join respectively the contact points P1A, P1B, P1C, etc. for the primary roll surface 13 (associated with the first main shaft 1), and P2A, P2B, P2C, etc. for the primary roll surface 23 (associated with the second main shaft 2).

Figure 2C:
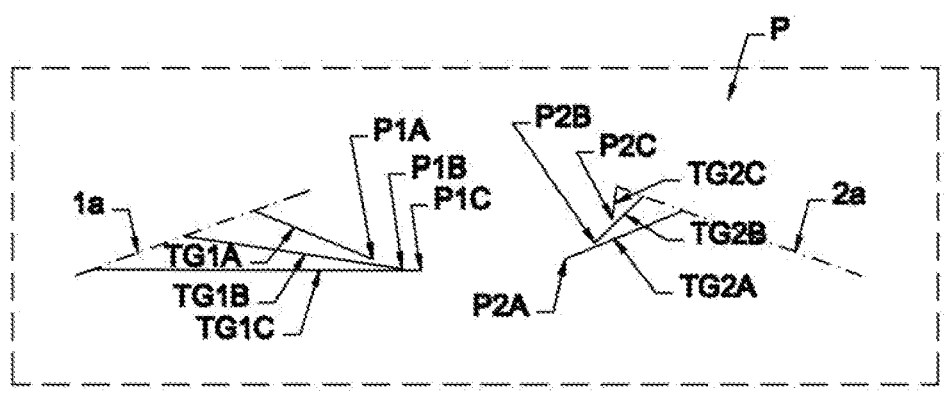
Figure 2D:
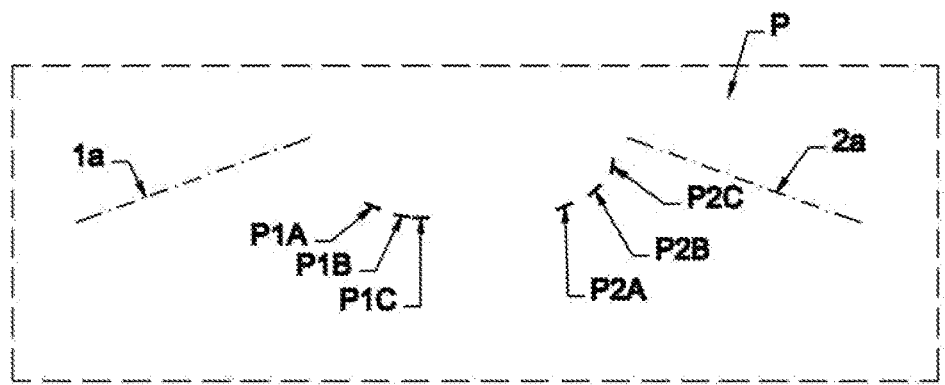

To illustrate the tracing method, FIG. 2C shows a series of line segments, each positioned in one of the points P1A, P1B, P1C and P2A, P2B, P2C and each inclined like the respective tangent. In practice, the corresponding generatrix curve is obtained by joining the segments.

Summarizing, the profile of the primary roll surfaces 13, 23 is drawn, with approximation as precise as is desired, by means of a succession of rotations, as small as desired, around a continuously variable point (center of instantaneous rotation) given by the intersection between the two straight lines R1 and R2, each perpendicular respectively to one of the tangent straight lines TG1 and TG2 in the contact points P1 and P2. Increasing the number of iterations increases the precision of the profile.

The result can be optimized varying the profile of the generatrix curves of the secondary roll surfaces 31, 32 of the auxiliary shaft 3 and varying the mutual initial position of the shafts 1, 2, 3.

In this way, the design can be optimized on the basis of the required transmission ratio and of the allowable stresses in the materials.

Advantageously, the radius of curvature of the generatrix curves of the secondary roll surfaces 31, 32 of the auxiliary shaft 3, lying on the reference plane P, is variable along said generatrix curves, to reduce stresses in the contact points.

The embodiments of FIGS. 1A and 1B were set as the basis for the above description because these figures are clearer depictions.

The same principles, employed to describe the aforesaid iterative method, can also be applied to alternative embodiments to those illustrated in FIGS. 1A through 2D, as will be appreciated below.

For example, the main shafts 1, 2 can be arranged so that the rotation axis 1*a* of one of the main shafts 1 intersects in one point the rotation axis 2*a* of the other main shaft 2 (in a configuration in which said rotation axes 1*a*, 2*a* are mutually incident, as shown by way of example in the figures from 1A to 3B), or said main shafts 1, 2 can be positioned so that the respective rotation axes 1*a*, 2*a* are mutually parallel or coincident (as shown by way of example in figures from 4A to 8B).

The auxiliary shaft 3 can be made in a single piece or, as shown by way of example in the figures from 7A to 9B, it can comprise two secondary shafts 3', 3" connected to each other by an engagement member 14 (advantageously, a gear) adapted to constrain said secondary shafts 3', 3" to maintain a constant ratio between the respective rotational speeds. A similar configuration is particularly advantageous when the two main shafts 1, 2 are mutually coaxial (as in the figures from 7A to 9B). Each of the two secondary shafts 3', 3" brings to a first end a respective secondary roll surface 31, 32, while the opposite ends will be configured so as to allow connection with the other secondary shaft 3', 3" (for example, a first secondary shaft may have a gear portion that cooperates with a complementary gear portion borne by the second secondary shaft, for example as shown in the figures from 7A to 9B).

The secondary shafts 3', 3" can be coaxial, or they can be rotatable around respective mutually offset rotation axes 3'a, 3"a (for example in the figures from 7A to 9B). In this latter case, what is stated above with reference to the rotation axes 3a of the auxiliary shaft 3 applies in a similar way to the rotation axes 3'a, 3"a of the secondary shafts 3', 3".

More specifically, it will be said that the intersection point T1 between the rotation axis 1a of the first main shaft 1 and the rotation axis 3'a of the corresponding secondary shaft 3' (i.e. the secondary shaft that stands on the first main shaft 1) is distinct from the intersection point T2 between the rotation axis 2a of the second main shaft 2 and the rotation axis 3"a of the corresponding secondary shaft 3" (i.e. the secondary shaft that stands on the second main shaft 2).

Moreover, the auxiliary shaft 3 (or the secondary shafts 3', 3") can be of the male type or of the female type. In this latter case, the secondary roll surfaces 31, 32 are arranged in such a way that the contact point with the respective primary roll surfaces 13, 23 faces toward the rotation axis of the auxiliary shaft 3, while in the male type it faces outward.

The same holds true for the main shafts 1, 2 and the respective primary roll surface 13, 23, in which the contact point can face toward the rotation axis or outward.

By way of example, the following cases can be distinguished:
- in the figures from 1A to 1B, from 6A to 7B and from 9A to 9B, the main shafts 1, 2 are in the female configuration (with the respective concave primary roll surfaces 13, 23), and the auxiliary shaft 3 is in the male configuration;
- in the figures from 3A to 3B, from 8A to 8B and from 10A to 10B, the main shafts 1, 2 are in the male configuration, and the auxiliary shaft 3 is in the female configuration; and
- in the figures from 4A to 5B, both the main shafts 13, 23 and the auxiliary shaft 3 are in the male configuration.

The solution with auxiliary shafts 3 of the female type is particularly favorable because it allows to reduce pressure between the surfaces in the contact zone.

Moreover, the configuration can be symmetrical or asymmetrical, in the sense that the primary roll surfaces 13, 23 can have equal and mutually specular shapes and concurrently also the secondary roll surfaces 31, 32 can have equal and mutually specular shapes (symmetrical drawing), or all primary and secondary roll surfaces 13, 23, 31, 32 can have mutually different shapes (asymmetrical drawing). In the illustrated examples, the asymmetrical construction arrangement is presented in FIGS. 5A and 5B (which, aside from said feature, is otherwise similar to the arrangement of FIGS. 4A and 4B, both having parallel main shafts and male auxiliary shaft). In any case, all construction arrangements presented herein can be implemented both in symmetrical and asymmetrical form.

If the configuration is symmetrical, the transmission ratio varies between a maximum value and a minimum value, which are one the reciprocal of the other. In this case, when the auxiliary shaft 3 is in the central position, the transmission ratio is equal to 1.

The asymmetrical design has the advantage that the transmission ratio varies between a maximum value and a minimum value, which are not one the reciprocal of the other. Therefore, in many applications the asymmetrical design is more appropriate. For example, the construction arrangement shown in FIGS. 5A and 5B has a transmission ratio that varies from approximately 1.2 to approximately 5, as required indicatively in the automotive field.

Figure 6A:
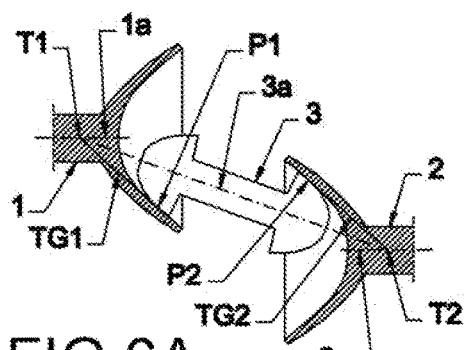
FIGS. 6A and 6B are two lateral schematic views of a system comprising two main shafts with parallel axes and an auxiliary shaft in the male configuration, according to an embodiment of the present invention.
Figure 6B:
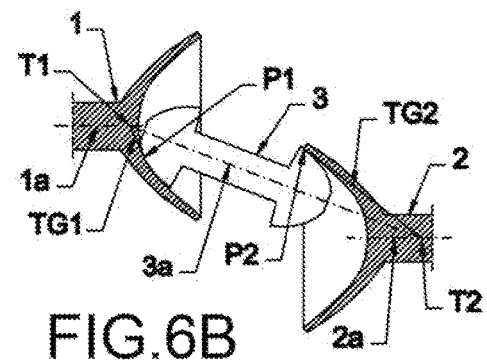

There are many possible combinations, and they also include the possibility of obtaining antimetric designs, as shown in FIGS. 6A and 6B.

From a practical viewpoint, the configurations that have the female auxiliary shaft also have the advantage that the latter, having a roll circle with greater diameter than that of the drive shaft, has lower speed of rotation than the drive shaft itself. This feature is favorable for the dimensioning of the bearings that support the auxiliary shaft 3.

In the construction arrangements provided with two secondary shafts 3', 3", it is possible to connect said secondary shafts 3', 3" with a gear 14 that determines between them a pre-set transmission ratio, which may also be different from one (as shown by way of example in the figures from 7A to 9B). In this way, a wide range of values of the transmission ratio of the transmission can be obtained.

Figure 9A:
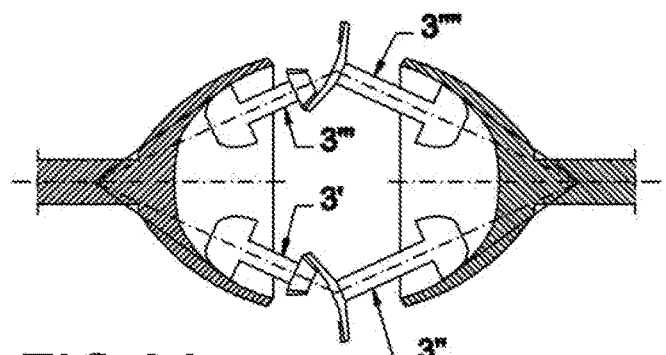
FIGS. 9A and 9B are two lateral schematic views of a system comprising two coaxial main shafts and two auxiliary shafts in turn formed each by two secondary shafts.
Figure 9B:
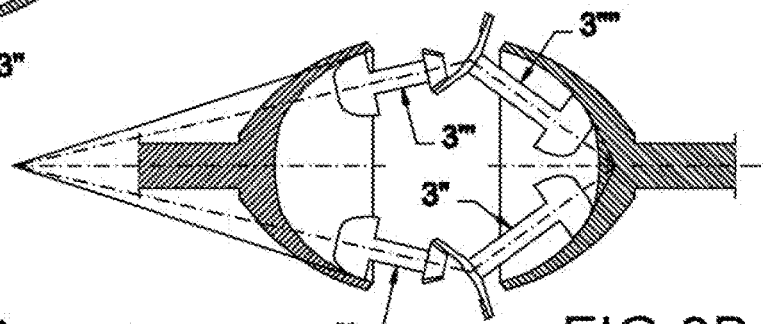

In some cases, it is also possible to adopt two distinct auxiliary shafts, as schematically shown in FIGS. 9A and 9B. This arrangement is similar to that of FIGS. 7A and 7B, but there are two distinct auxiliary shafts 3 (instead of one) each formed by two secondary shafts (identified by the references 3', 3" in the lower part of the respective figures), and 3''', 3'''' in the upper part of the respective figures).

Figure 7A:
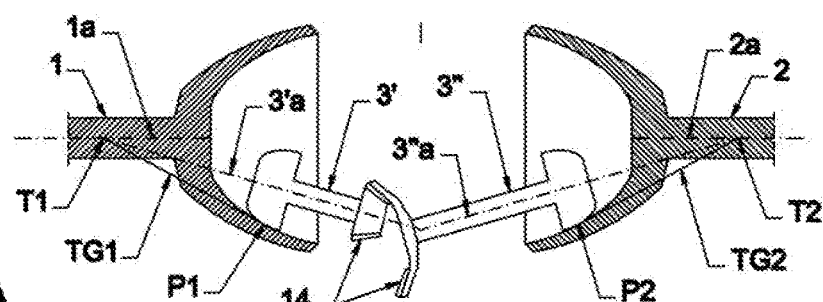
FIGS. 7A and 7B are two lateral schematic views of a system comprising two coaxial main shafts and an auxiliary shaft in the male configuration, in turn formed by two secondary shafts, which mesh with each other, according to an embodiment of the present invention.
Figure 7B:
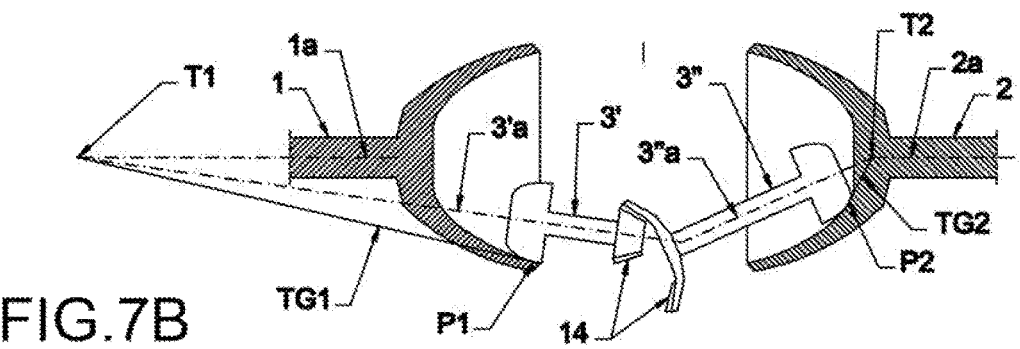
Figure 8A:
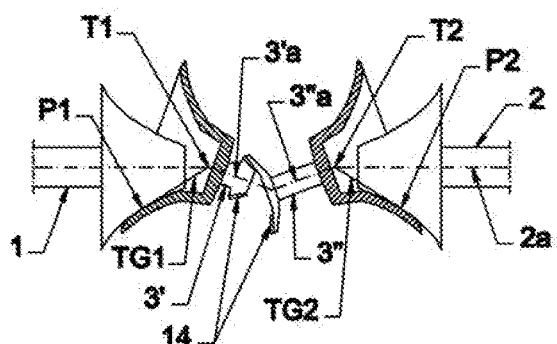
FIGS. 8A and 8B are two lateral schematic views of a system comprising two coaxial main shafts and an auxiliary shaft in the female configuration, in turn formed by two secondary shafts that mesh with each other, according to an embodiment of the present invention.
Figure 8B:
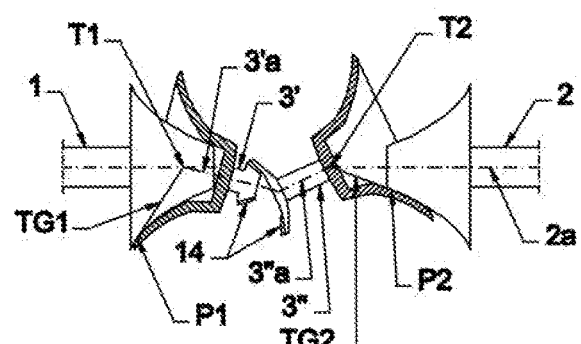

For ease of reading, in the aforesaid FIGS. 9A and 9B all other reference numbers, which are similar to those of FIGS. 7A and 7B, are omitted.

The adoption of two auxiliary shafts allows to double the contact points and therefore to double the transmitted torque for equal overall external dimensions. Moreover, this arrangement has favorable effects on the efficiency and on the dimensioning of the bearings of the main shafts, because the radial components of the forces transmitted by the two shafts balance each other.

As stated previously, an important aspect to take into consideration in the design is that of limiting the local stresses in the contact zone, where the rolling that allows to transmit motion takes place. From this standpoint it is important that, insofar as possible, the main curvatures of each pair of roll surfaces in the respective contact points are such as to expand the footprint of the contact zone (which obviously in reality is not a single point, because of the deformations under stress).

On this matter, it should be remembered that the main curvatures of a surface lie on two mutually perpendicular planes. Moreover, we can observe that, since the axes of the main shafts are incident to the axis of the auxiliary shaft, the main curvatures of the two roll surfaces in contact lie, in each contact point, on the same planes.

Since there are two mutually tangential surfaces, obviously there are four main curvatures. Every time a comparison between the curvatures is provided, it shall be understood that the comparison takes place solely between the curvature of a surface and the corresponding curvature of the other surface in contact therewith (i.e. that the comparison takes place solely within each plane of lay of the main curvatures). Therefore, the comparison will never regard curvatures lying on different planes (although, to avoid making the description too ponderous, this will no longer be specified).

This stated, it is necessary for the curvatures of the two surfaces in contact (as specified above) to have values that are close to each other and opposite signs. This condition is obtained for example by approaching a concave surface and a convex surface with slightly different radii, or two saddle surfaces, obviously positioned with the curvatures corresponding with each other.

From this viewpoint, "female" solutions (i.e., with male auxiliary shaft and female main shafts, or vice versa) are favorable, in which the curvatures of the roll surfaces in mutual contact have, for each plane, mutually opposite signs (i.e. coupling of a concave profile for one surface and a convex profile for the other), as schematically shown in the figures from 1A to 1B, from 3A to 3B, and from 6A to 10B.

In a different manner, the curvatures of the roll surfaces in mutual contact can have, in one of the two planes, the same sign (i.e. through the coupling between two convex profiles), as is the case in the prior art solution of logarithmic CVT transmissions and in the embodiments schematically shown in the figures from 4A to 5B.

If roll surfaces with mutually close radii and opposite signs are adopted, it is obtained that the contact footprint under stress increases, and for equal force applied the local stresses decrease.

The expedient of adopting surfaces with mutually close radii and opposite signs, however, cannot be implemented beyond a certain extent because, if the radii of the two surfaces actually had equal and opposite values, the two surfaces would locally have full correspondence and there would be no rolling, but there would be meshing.

In addition, it is pointed out, as mentioned above, that the absence of prying motion, that characterizes the present invention, allows to promote the formation of larger contact footprints, without experiencing wear and rubbing losses.

These advantages are due to the fact that the two surfaces in contact do not have, in the relative motion between them, any component of rotation around the axis normal to the two surfaces in the contact point, but rather they have a pure rolling motion. Therefore, in proximity to the contact point the homologous points belonging to the two surfaces (even outside the contact point, provided it is at a small distance therefrom) have equal speeds.

Figure 10A:
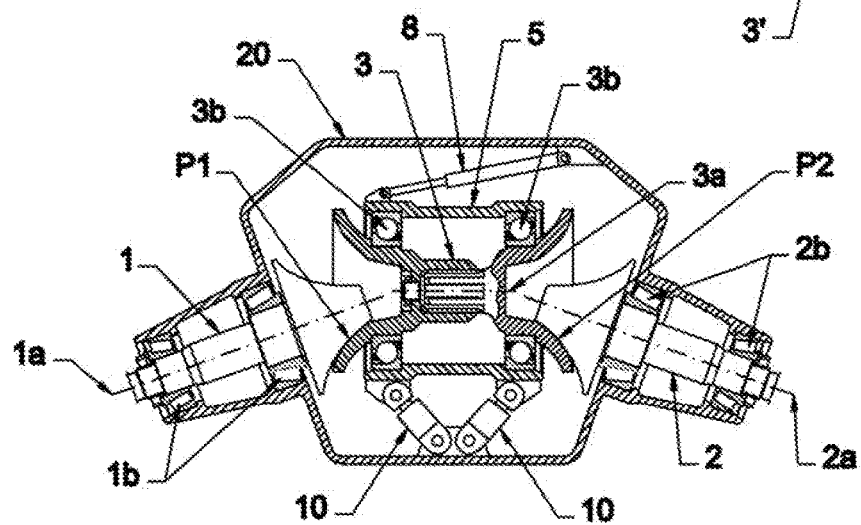
FIGS. 10A and 10B are two lateral views of a transmission (according to a similar embodiment to the one represented in the schematic FIGS. 3A and 3B) showing a slide supporting the auxiliary shaft and related actuator means, according to an embodiment of the present invention.
Figure 10B:
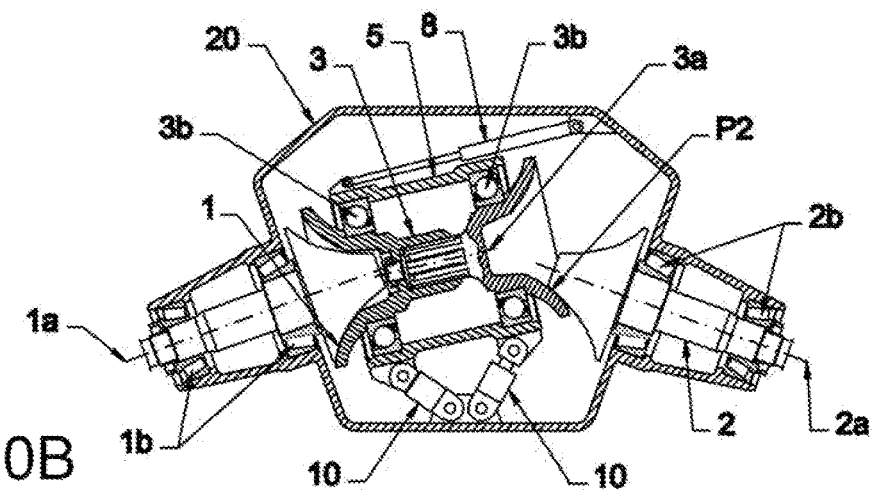

Described hereafter is a plurality of embodiments of a system for supporting and moving the auxiliary shaft 3 that can be incorporated in a continuously variable transmission according to the present invention. FIGS. 10A and 10B schematically illustrate one of said embodiments. In this configuration, the main shafts 1, 2 are mutually incident and the auxiliary shaft 3 is of the female type. It is nonetheless understood that to the support and movement system can be associated two main shafts 1, 2 and an auxiliary shaft 3 (also including a pair of secondary shafts 3', 3") according to any of the embodiments described above.

The main shafts 1, 2 are advantageously attached to a case or outer frame 20 by means of the bearings 1b, 2b. Therefore, said main shafts 1, 2 can only rotate around their own rotation axes 1a, 2a.

For the rotation axis 3a of the auxiliary shaft 3 to move only in the reference plane P, the auxiliary shaft 3 is advantageously attached (for example, by means of two bearings 3b) to a movable body or slide 5, movable along the reference plane P.

In FIGS. 10A and 10B, for practical mounting needs of the bearings 3b, the auxiliary shaft 3 is represented by way of example divided in two parts, rigidly connected to each other.

On the slide 5 act one or more actuator means 10 for pressing the auxiliary shaft 3 against the main shafts 1 and 2 so as to generate, at the contact points P1, P2 between the primary roll surfaces 13, 23 and the corresponding secondary roll surfaces 31, 32, a force perpendicular to said primary roll surfaces 13, 23.

In particular, the bearings 3b allow the auxiliary shaft 3 to rotate only around its own axis 3a, not allowing any other displacement or rotation with respect to the slide 5.

The slide 5 is so constrained as to move only in the reference plane P.

For this purpose, the slide 5 can be provided with two planar faces or skids (not shown in the figure), opposite to each other, positioned one on each side with respect to the reference plane P and parallel thereto. Said skids are appropriately in contact, with small play, with respect to two planar surfaces or guides (not illustrated), parallel to the reference plane P and integral with the outer frame 20. The skids, appropriately lubricated, can rub on the guides. In this way the two guides, integral with the outer frame 20, obligate the slide 5 to move only in the reference plane P.

More specifically, the coupling between the skids and the guides locks three of the six degrees of freedom of the slide 5, and specifically the translation in the perpendicular direction to the reference plane P and the two rotations with respect to the two orthogonal axes lying in the reference plane P.

It is stressed that the rubbing between the skids and the guides is irrelevant for the purposes of the mechanical efficiency of the system, because the relative displacement between said surfaces serves only to allow the regulation of the transmission ratio. Instead, in the kinematic system that determines the transmission of motion there is no rubbing.

To realize the actuator means 10, to the slide 5 can be connected two hydraulic cylinders whose opposite end is connected to the outer frame 20. The two hydraulic cylinders, whose axes lie on the reference plane P, thrust the slide 5 in the direction of the main shafts 1 and 2, and serve to maintain the secondary roll surfaces 31, 32 of the auxiliary shaft 3 in contact with the corresponding primary roll surfaces 13, 23 of the main shafts 1, 2, and to apply, in the contact points between said roll surfaces, the desired normal force, which allows to generate by friction the tangential force that transmits the motion.

Any use of hydraulic cylinders, or other devices that advantageously allow to regulate the force generated thereby, allows to modify the normal force applied in the contact points P1 and P2 as a function to the torque to be transmitted. This expedient allows to improve the mechanical efficiency of the transmission.

While the device has no rubbing in the theoretical kinematic motion, it is subject to losses (i.e. dissipations of energy) in the bearings of the shafts and in the rolling of the surfaces that transmit motion (losses due to rolling friction).

These losses increase as the forces applied between the contact surfaces increase. Therefore, it is useless and harmful to apply a greater normal force to the surfaces than the one needed to obtain by friction the tangential force necessary to transmit, with adequate margin, the required torque.

Consequently, it is very favorable to be able to vary the force applied between the roll surfaces as a function of the torque to be transmitted.

The presence of two distinct hydraulic cylinders allows to regulate separately and at will the normal force exerted in the two contact points P1, P2.

Figure 11:
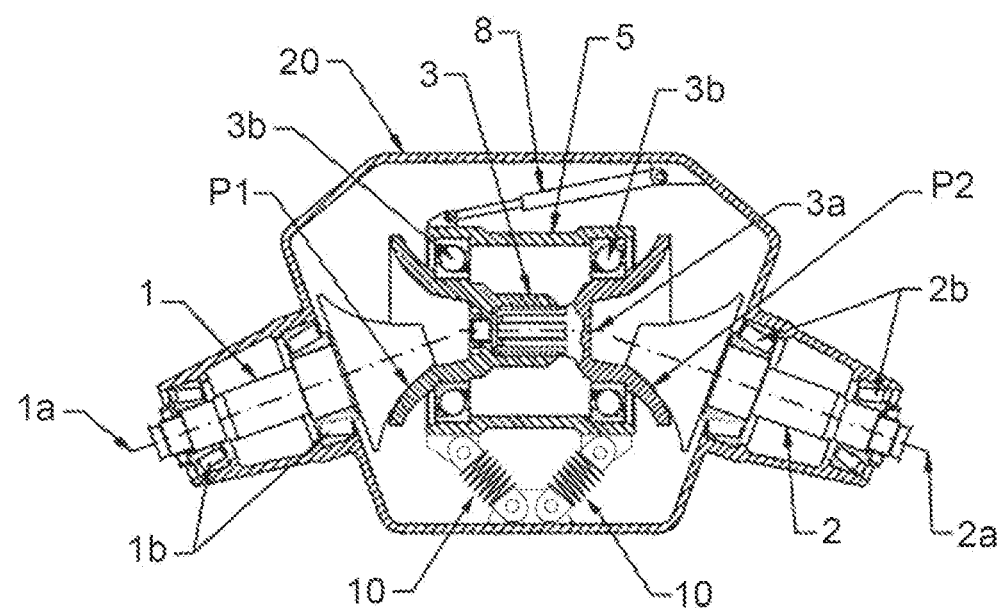
FIG. 11 is a lateral view of a transmission including springs, according to an embodiment of the present invention.

According to other embodiments, the two hydraulic cylinders can be replaced by other devices able to generate the necessary normal force between the roll surfaces. For example, alternatively or in combination with the hydraulic cylinders, preloaded springs can be used, such as those shown in FIG. 11.

As stated, the transmission ratio is regulated by moving the auxiliary shaft 3 so as to change the position of the contact points P1, P2 respectively between the primary 13 and secondary 31 roll surfaces and between the primary 23 and secondary 32 roll surfaces.

According to a preferred embodiment (shown by way of example in FIGS. 10A and 10B), the transmission ratio is regulated by moving the slide 5 along the reference plane P, by means of a hydraulic cylinder (8), attached at one end to the slide 5 and at the opposite end to the case 20, so that the excursion and/or the inclination of the hydraulic cylinder 8 causes the slide 5 to move along the reference plane P.

Alternatively to a hydraulic cylinder, according to an embodiment not illustrated herein, for example an electric actuator or a manual lever can be applied.

Different aspects and embodiments of a continuously variable transmission according to the invention have been described. It is understood that each embodiment can be combined with any other embodiment. The invention, moreover, is not limited to the described environment, but it may be varied within the scope defined by the claims.

The invention claimed is:

1. A continuously variable transmission comprising:
a first main shaft and a second main shaft, having respective rotation axes fixed and coplanar with respect to a reference plane, said first and second main shafts each forming a primary roll surface shaped as a solid of revolution of one or more generatrix curves;
at least one auxiliary shaft, rotatable around a respective rotation axis, said auxiliary shaft being interposed between said first and second main shafts and comprising two secondary roll surfaces, each secondary roll surface being shaped as a solid of revolution and placed in contact with a respective primary roll surface of the first and second main shafts, so as to transmit motion from one main shaft to the other main shaft, said auxiliary shaft being configured so that its rotation axis is movable only along the reference plane identified by the rotation axes of the first and second main shafts;
wherein the primary roll surfaces are shaped such that:
in said reference plane, a line tangent to the primary roll surface of the first main shaft and to the respective secondary roll surface of the auxiliary shaft in a contact point between said primary roll surface of the first main shaft and the respective secondary roll surface of the auxiliary shaft passes through an intersection point between the rotation axis of said first main shaft and the rotation axis of said auxiliary shaft; and
in said reference plane, a line tangent to the primary roll surface of the second main shaft and to the respective secondary roll surface of the auxiliary shaft in a contact point between said primary roll surface of the second main shaft and the respective secondary roll surface of the auxiliary shaft passes through an intersection point between the rotation axis of said second main shaft and the rotation axis of said auxiliary shaft; and
the intersection point between the rotation axis of said first main shaft and the rotation axis of said auxiliary shaft is distinct from the intersection point between the rotation axis of said second main shaft and the rotation axis of said auxiliary shaft;
so that the secondary roll surfaces of the auxiliary shaft roll without rubbing and prying motion on the respective primary roll surfaces of the first and second main shafts, in all operating conditions;
wherein each of the first and second main shafts is bound so as not to move in a direction parallel to its rotation axis such that it can only rotate about its rotation axis.

2. The continuously variable transmission of claim 1, wherein the rotation axes of the first and second main shafts are parallel but not coaxial.

3. The continuously variable transmission of claim 1, wherein the rotation axis of the first main shaft intersects in one point the rotation axis of the second main shaft.

4. The continuously variable transmission of claim 1, wherein the primary roll surfaces of the first and second main shafts are different from one another.

5. The continuously variable transmission of claim 1, wherein the auxiliary shaft comprises two secondary shafts connected to each other by an engagement member adapted to constrain said two secondary shafts to maintain a constant ratio between respective rotational speeds.

6. The continuously variable transmission of claim 1, wherein the primary roll surfaces of the first and second main shafts or the secondary roll surfaces of the auxiliary shaft are arranged so that the contact point used for transmission of motion faces towards the rotation axis of the respective shaft.

7. The continuously variable transmission of claim 1, wherein the auxiliary shaft is supported by a slide movable along the reference plane, one or more actuator means acting on said slide for pressing the auxiliary shaft against the first and second main shafts to generate, at contact points between the primary roll surfaces and respective secondary roll surfaces, a force perpendicular to said primary and secondary roll surfaces.

8. The continuously variable transmission of claim 7, wherein the actuator means are a pair of hydraulic actuators and/or springs connected at a first end to the slide, and at a second end to a frame, fixed relative to the reference plane and configured to house the slide and at least part of the first and second main shafts.

9. The continuously variable transmission of claim 7, wherein the actuator means are adjustable independently to apply, by the auxiliary shaft, a normal force on the primary roll surfaces varying according to a torque to be transmitted and adjustable separately for each contact point.

10. The continuously variable transmission of claim 7, wherein adjustment of transmission ratio occurs by moving the slide along the reference plane, by a hydraulic cylinder.

11. A continuously variable transmission comprising:
a first main shaft and a second main shaft, having respective rotation axes fixed and coplanar with respect to a reference plane, the rotation axis of the first main shaft intersecting in one point the rotation axis of the second main shaft, said first and second main shafts each comprising a primary roll surface shaped as a solid of revolution;
at least one auxiliary shaft, rotatable around a respective rotation axis, said auxiliary shaft being interposed between said first and second main shafts and comprising two secondary roll surfaces, each secondary roll surface being shaped as a solid of revolution and placed in contact with a respective primary roll surface of the first and second main shafts, so as to transmit motion from one main shaft to the other main shaft, said auxiliary shaft being configured so that its rotation axis is movable only along the reference plane identified by the rotation axes of the first and second main shafts;

wherein the primary roll surfaces are shaped such that:

in said reference plane, a line tangent to the primary roll surface of the first main shaft and to the respective secondary roll surface of the auxiliary shaft in a contact point between said primary roll surface of the first main shaft and the respective secondary roll surface of the auxiliary shaft passes through an intersection point between the rotation axis of said first main shaft and the rotation axis of said auxiliary shaft; and in said reference plane, a line tangent to the primary roll surface of the second main shaft and to the respective secondary roll surface of the auxiliary shaft in a contact point between said primary roll surface of the second main shaft and the respective secondary roll surface of the auxiliary shaft passes through an intersection point between the rotation axis of said second main shaft and the rotation axis of said auxiliary shaft; and the intersection point between the rotation axis of said first main shaft and the rotation axis of said auxiliary shaft is distinct from the intersection point between the rotation axis of said second main shaft and the rotation axis of said auxiliary shaft;

so that the secondary roll surfaces of the auxiliary shaft roll without rubbing and prying motion on the respective primary roll surfaces of the first and second main shafts, in all operating conditions.

12. A continuously variable transmission comprising:

a first main shaft and a second main shaft, having respective rotation axes fixed and coplanar with respect to a reference plane, said first and second main shafts each comprising a primary roll surface shaped as a solid of revolution;

at least one auxiliary shaft, rotatable around a respective rotation axis, said auxiliary shaft being interposed between said first and second main shafts and comprising two secondary roll surfaces, each secondary roll surface being shaped as a solid of revolution and placed in contact with a respective primary roll surface of the first and second main shafts, so as to transmit motion from one main shaft to the other main shaft, said auxiliary shaft being configured so that its rotation axis is movable only along the reference plane identified by the rotation axes of the first and second main shafts, said auxiliary shaft comprising two secondary shafts connected to each other by an engagement member adapted to constrain said two secondary shafts to maintain a constant ratio between respective rotational speeds;

wherein the primary roll surfaces are shaped such that:

in said reference plane, a line tangent to the primary roll surface of the first main shaft and to the respective secondary roll surface of the auxiliary shaft in a contact point between said primary roll surface of the first main shaft and the respective secondary roll surface of the auxiliary shaft passes through an intersection point between the rotation axis of said first main shaft and the rotation axis of said auxiliary shaft; and in said reference plane, a line tangent to the primary roll surface of the second main shaft and to the respective secondary roll surface of the auxiliary shaft in a contact point between said primary roll surface of the second main shaft and the respective secondary roll surface of the auxiliary shaft passes through an intersection point between the rotation axis of said second main shaft and the rotation axis of said auxiliary shaft; and the intersection point between the rotation axis of said first main shaft and the rotation axis of said auxiliary shaft is distinct from the intersection point between the rotation axis of said second main shaft and the rotation axis of said auxiliary shaft;

so that the secondary roll surfaces of the auxiliary shaft roll without rubbing and prying motion on the respective primary roll surfaces of the first and second main shafts, in all operating conditions.

13. A continuously variable transmission comprising:

a first main shaft and a second main shaft, having respective rotation axes fixed and coplanar with respect to a reference plane, said first and second main shafts each forming a primary roll surface shaped as a solid of revolution of one or more generatrix curves;

at least one auxiliary shaft, rotatable around a respective rotation axis, said auxiliary shaft being interposed between said first and second main shafts and comprising two secondary roll surfaces, each secondary roll surface being shaped as a solid of revolution and placed in contact with a respective primary roll surface of the first and second main shafts, so as to transmit motion from one main shaft to the other main shaft, said auxiliary shaft being configured so that its rotation axis is movable only along the reference plane identified by the rotation axes of the first and second main shafts;

wherein the primary roll surfaces are shaped such that:

in said reference plane, a line tangent to the primary roll surface of the first main shaft and to the respective secondary roll surface of the auxiliary shaft in a contact point between said primary roll surface of the first main shaft and the respective secondary roll surface of the auxiliary shaft passes through an intersection point between the rotation axis of said first main shaft and the rotation axis of said auxiliary shaft; and in said reference plane, a line tangent to the primary roll surface of the second main shaft and to the respective secondary roll surface of the auxiliary shaft in a contact point between said primary roll surface of the second main shaft and the respective secondary roll surface of the auxiliary shaft passes through an intersection point between the rotation axis of said second main shaft and the rotation axis of said auxiliary shaft; and the intersection point between the rotation axis of said first main shaft and the rotation axis of said auxiliary shaft is distinct from the intersection point between the rotation axis of said second main shaft and the rotation axis of said auxiliary shaft;

so that the secondary roll surfaces of the auxiliary shaft roll without rubbing and prying motion on the respective primary roll surfaces of the first and second main shafts, in all operating conditions;

wherein each of the first and second main shafts is bound so as not to move in a direction parallel to its rotation axis such that it can only rotate about its rotation axis, in such a way that the respective primary roll surfaces are bound so as not to move in a direction parallel to the rotation axes of their main shafts, such that they can only rotate about the rotation axes thereof.

* * * * *